United States Patent
Yamanaka

[11] Patent Number: 5,923,635
[45] Date of Patent: Jul. 13, 1999

[54] OPTICAL INFORMATION RECORDING OR PLAYBACKING SYSTEM, OPTICAL HEAD APPARATUS USED IN THE SYSTEM AND METHOD FOR RECORDING OR PLAYBACKING OPTICAL INFORMATION

[75] Inventor: Yutaka Yamanaka, Tokyo, Japan

[73] Assignee: NEC Corporation, Tokyo, Japan

[21] Appl. No.: 08/840,757

[22] Filed: Apr. 16, 1997

[30] Foreign Application Priority Data

Apr. 17, 1996 [JP] Japan ................................ 8-095411

[51] Int. Cl.$^6$ ........................................................ G11B 7/00
[52] U.S. Cl. ............................................ 369/112; 369/94
[58] Field of Search ................................. 369/112, 103, 369/109, 110, 47, 48, 49, 50, 54, 58, 59, 44.12, 44.37, 93, 94

[56] References Cited

U.S. PATENT DOCUMENTS 5,231,620  7/1993  Ohuchida .

FOREIGN PATENT DOCUMENTS

| 610055 | 1/1994 | European Pat. Off. . |
| 766235 | 9/1996 | European Pat. Off. . |
| 7-098431 | 4/1995 | Japan . |
| 8-249707 | 9/1996 | Japan . |

*Primary Examiner*—Muhammad N. Edun
*Attorney, Agent, or Firm*—Sughrue, Mion, Zinn, Macpeak & Seas, PLLC

[57] ABSTRACT

An optical disk apparatus is provided that is capable of recording and playback of optical disks such as CDs having different substrate thicknesses. Light exiting a laser light source is passed through a parallel flat plate and focused by an optical lens as a minute spot onto the recording surface at the rear side of the plate. The head apparatus has a hologram element having a grating pattern formed by interference between two spherical wavefronts, the lens system being configured so that a minimum spot size is formed when the 0th order transmitted light of the hologram element passes through a parallel flat plate having a first thickness, and so that a minimum spot is formed when 1st order diffracted light of the hologram element passes through a parallel flat plate of a second thickness; fabrication of the hologram element grating being facilitated by the simplicity of the pattern thereof.

18 Claims, 4 Drawing Sheets

OPTICAL INFORMATION RECORDING OR PLAYBACKING SYSTEM, OPTICAL HEAD APPARATUS USED IN THE SYSTEM AND METHOD FOR RECORDING OR PLAYBACKING OPTICAL INFORMATION

BACKGROUND OF THE INVENTION

1. Field of the Invention

The present invention relates to an optical information recording and/or playbacking system and an optical head apparatus used in this system, especially used in an optical disk apparatus such as a compact disc, and further relates to a method for recording and/or playbacking optical information.

The present invention also relates to a technical concept in which recording to and playback from an optical medium, such as an optical disk having a first and/or a second recording layer which are formed inside or on one surface of a transparent substrate, wherein a first distance formed between a surface of the transparent substrate and the first recording layer is different from a second distance formed between the surface of the transparent substrate and the second recording layer, are performed.

2. Description of Related Art

In a conventional optical information recording and/or playbacking apparatus such as an optical disk apparatus, an optical medium, for example, an optical disk is formed from an optical information recording layer in the order of microns, and a transparent substrate is provided to protect the recording layer, and a minute spot of light is formed onto a surface of the recording layer by transmission through the transparent substrate to perform recording and playback.

In such an optical information recording and/or playbacking apparatus, a focused beam of light passes within a transparent substrate, which is a flat and parallel plate, and there occurs a wavefront aberration in the transmitted beam that exhibits a dependency on the thickness of the flat parallel plate.

This wavefront aberration manifests itself as a skew in the equiphase surface of the focused beam from being a truly spherical surface.

If this skew is large, because a minute spot that is close to the diffraction limit is formed from the focused light onto the surface of the recording layer, the lens in the optical system of the optical head mechanism is designed so as to correct this wavefront aberration.

Recently, it has been possible to include correction mechanism such as provided by a single aspherical objective lens.

The thickness of the substrate of an optical information recording medium differs, depending on the purpose thereof. When there is a difference in the substrate thickness, because the above-noted wavefront aberration amount of compensation also differs, in an optical head in the past, it was only possible to perform recording and playback with respect to an optical disk having a specific substrate thickness.

In contrast to the above situation, as noted in pages 27 through 29 of No. 1, Vol. 1 of the Optical Review (1994), there has been a proposal for using the 0th order transmitted light and 1st order diffracted light each being created by a hologram element to enable the use of a single optical head for recording and playback with respect to two optical disks having different substrate thicknesses.

Figure 5:
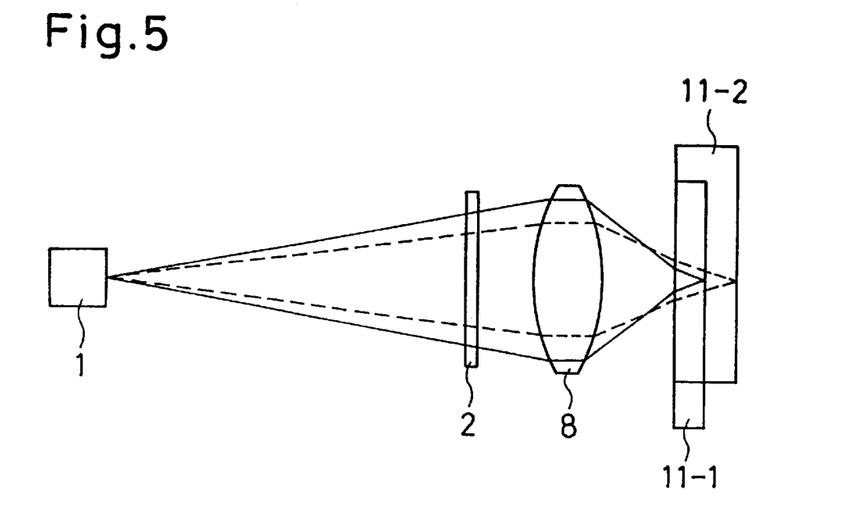
FIG. 5 is a simplified drawing which shows an optical information recording and/or playbacking system in the prior art.

FIG. 5 shows a general view of the related optical head apparatus.

The optical head apparatus which is shown in FIG. 5 is formed by a semiconductor laser 1, a hologram element 2, and an optical head comprising an objective lens 8, the objective lens 8 being designed so as to accommodate a first optical disk 11-1 which has a substrate thickness of 0.6 mm, playback being made from a disk having this thickness by means of the 0th order transmitted light of a hologram element 2, in which a change of phase does not occur.

To accommodate a second disk 11-2 having a substrate thickness of 1.2 mm the hologram element 2 has a grating formed so that 1st order diffracted light will correct the aberration which is dependent upon the transmitted light of the objective lens, in accordance with the difference in substrate thickness.

The shape of the grating of the hologram element is established by the interference of the incident light wavefront and the exiting light wavefront at the hologram surface position.

The optical medium such as an optical disk even as shown in FIG. 5, is also constructed from a recording layer and a transparent substrate, therefore the aberration which is caused by the parallel flat plate that is the transparent substrate, does not represent a simple spherical wave, but rather a complex aberration which includes an aspherical surface.

Therefore, the hologram element used to correct this type of aberration must also have a grating that in general forms an aspherical wavefront.

In view of the above-noted prior art, an object of the present invention is to provide an optical information recording and/or playbacking system and an optical head apparatus used in this system, especially used in an optical disk apparatus such as for a compact disc, and further provide a method for recording and/or playbacking optical information.

More specifically, another object of the present invention is to provide an optical information recording and/or playbacking system and an optical head apparatus used in this system, which are capable of accommodating any one of optical information recording mediums such as disks having a plurality of different substrate thicknesses.

SUMMARY OF THE INVENTION

To achieve the above-noted object, the present invention has the following described technical constitution.

Namely, a first aspect of the present invention provides an optical information recording or playbacking system which comprises a laser light source means, an optical information recording medium which has at least one recording on the rear surface of a transparent substrate, and an optical head means which has an optical lens forming a minute spot from the light emitted from the laser light source means onto the recording layer of the optical information recording medium, wherein the optical information recording medium including one selected from a recording medium having a first recording layer which is formed at a place apart from a top surface of the transparent substrate by a first distance, a recording medium having a second recording layer which is formed at a place apart from the top surface of the transparent substrate by a second distance different from the first distance, and a recording medium having both the first and second recording layers therein, whereby either one of the first and second recording layers is selectively used; and wherein the optical head means is provided with a hologram element at a place formed between the laser light source means and the optical lens, and the system includes a hologram element which has a function in that the element divides the light emitted from the laser light source means into 0th order transmitted light which forms a minute spot from the light emitted from the laser light source means onto the first recording layer, and 1st order diffracted light which forms a minute spot on the second recording layer, and further, wherein a grating shape of the hologram element is configured by an interference fringe formed between a spherical surface wave emitted from the laser light source means and a spherical surface wave emitted from an imaginary point located on an optical axis, and a light which would be emitted therefrom forms a minute spot on the second recording layer when the optical lens is used.

A second aspect of the present invention provides an optical head used in an optical information recording or playbacking system which comprises a laser light source, an optical information recording medium which has at least one recording layer on the rear surface of a transparent substrate, and an optical head which has an optical lens forming a minute spot from the light emitted from the laser light source onto the recording layer of the optical information recording medium, and wherein the optical information recording medium to be used for recording or playbacking the optical information includes one selected from a recording medium having a first recording layer which is formed at a place apart from a top surface of the transparent substrate by a first distance, a recording medium having a second recording layer which is formed at a place apart from the top surface of the transparent substrate by a second distance, different from the first distance and a recording medium having both the first and second recording layers therein, whereby either one of the first and second recording layers is selectively used, and the optical head of the present invention is provided with an optical lens and a hologram element at a place formed between the laser light source means and the optical lens, and the hologram element has a function in that the element divides the light emitted from the laser light source means into 0th order transmitted light which forms a minute spot from the light emitted from the laser light source means onto the first recording layer, and 1st order diffracted light which forms a minute spot on the second recording layer, and further, wherein a grating shape of the hologram element is configured by an interference fringe formed between a spherical surface wave emitted from the laser light source means and a spherical surface wave emitted from an imaginary point located on an optical axis, and a light which would be emitted therefrom forms a minute spot on the second recording layer when the optical lens is used.

Further, a third aspect of the present invention, provides a method for recording or playbacking optical information used in an optical information recording or playbacking system which comprises a laser light source means, an optical information recording medium which has at least one recording layer on the rear surface of a transparent substrate, and an optical head means which has an optical lens forming a minute spot from the light emitted from the laser light source onto the recording layer of the optical information recording medium, and the method for recording or playbacking optical information of the present invention comprises steps of; using as an optical information recording medium, a recording medium selected from a group of a recording medium having a first recording layer which is formed at a place apart from a top surface of the transparent substrate by a first distance, a recording medium having a second recording layer which is formed at a place apart from the top surface of the transparent substrate by a second distance different from the first distance, and a recording medium having both the first and second recording layers therein, whereby either one of the first and second recording layers is selectively used; providing in the optical head means, and a hologram element at a place formed between the laser light source means and the optical lens, the hologram element having a function to divide the light emitted from the laser light source means into 0th order transmitted light which forms a minute spot from the light emitted from the laser light source means onto the first recording layer, and 1st order diffracted light which forms a minute spot on the second recording layer, and having a grating shape of the hologram element configured by an interference fringe formed between a spherical surface wave emitted from the laser light source means and a spherical surface wave emitted from an imaginary point located on an optical axis, and a light which would be emitted therefrom forms a minute spot on the second recording layer when the optical lens is used.

BRIEF DESCRIPTION OF THE DRAWINGS

FIG. 6 (A) shows a diagram illustrating a way to form an interference fringe used in the present invention and FIG. 6 (B) shows one embodiment of the interference fringe used in the present invention.

DETAILED DESCRIPTION OF THE INVENTION

The embodiments of the present invention will be described, hereunder, with reference being made to the relevant accompanying drawings.

Figure 1:
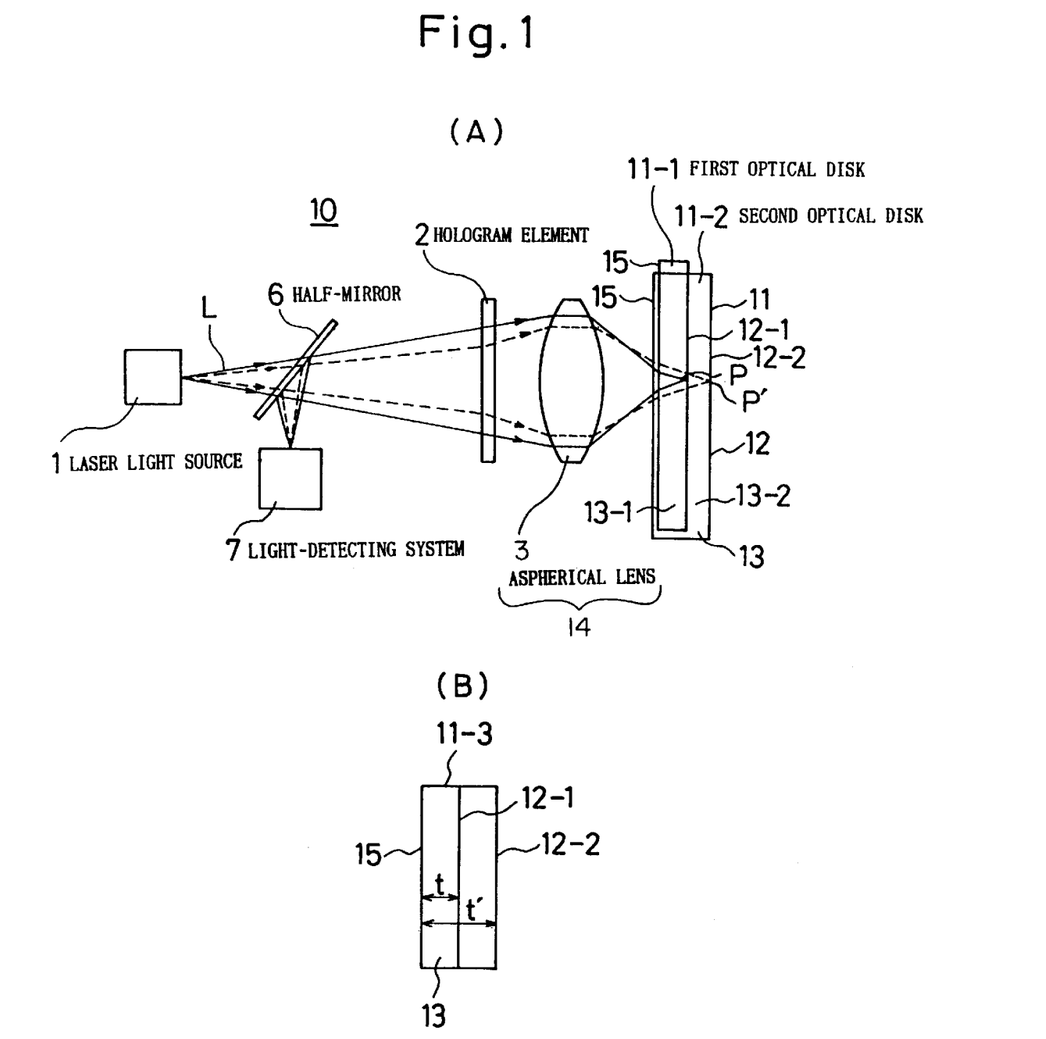
FIG. 1(A) is a simplified drawing which shows an embodiment of an optical information recording and/or playbacking system including an optical head means according to the present invention.
FIG. 1(B) shows one embodiment of an optical recording medium which can be used in the present invention.
Figure 6:
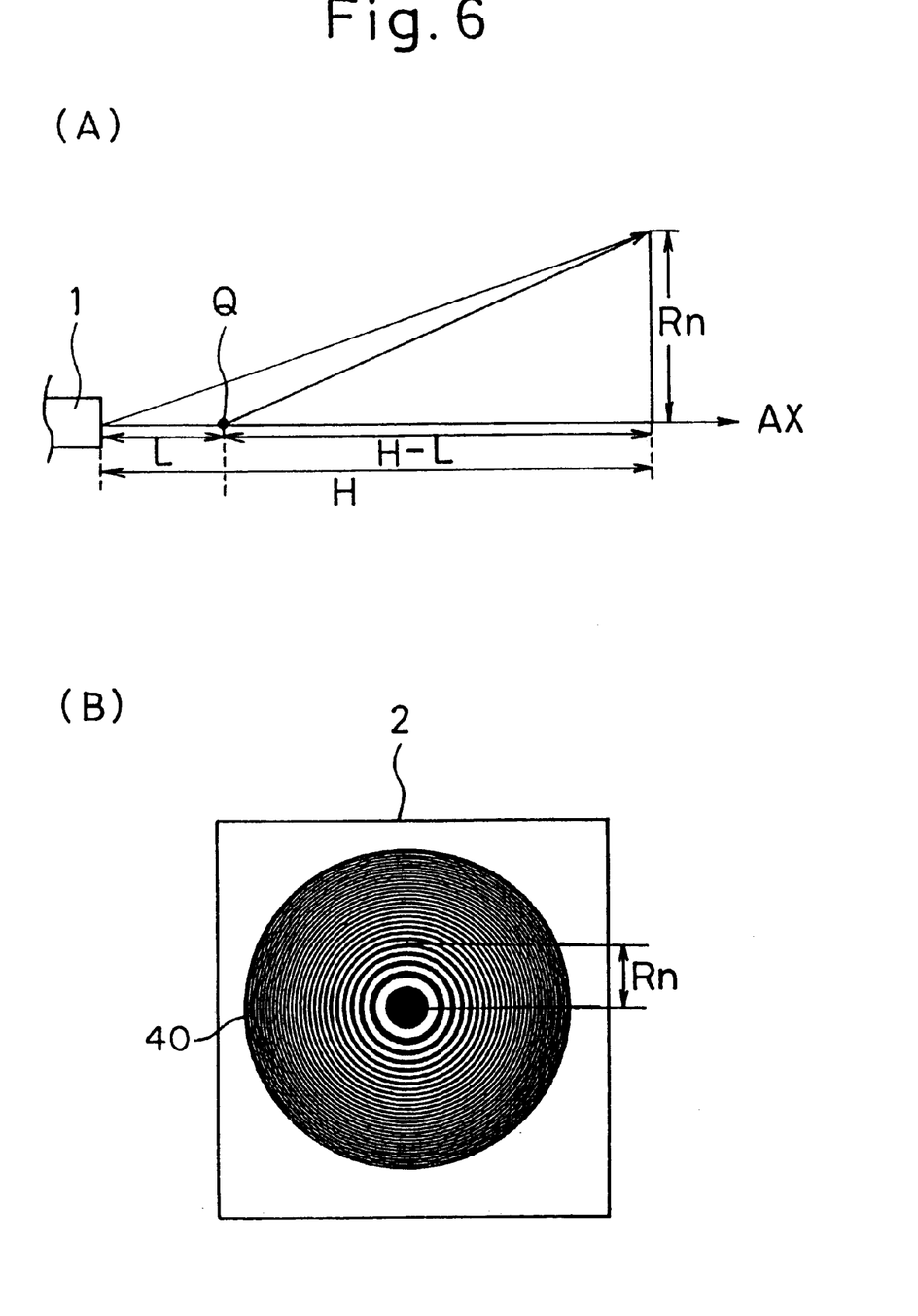

FIGS. 1(A) and 1(B) show one embodiment of an optical information recording and/or playbacking system of the present invention in that an optical information recording or playbacking system 10 which comprises a laser light source means 1, an optical information recording medium 11 which has at least one recording layer 12 on the rear surface of a transparent substrate 13, and an optical head means 14 which has an optical lens 3 forming a minute spot P from the light L emitted from the laser light source means 1 onto the recording layer 12 of the optical information recording medium 11, wherein the optical information recording medium 11 including one selected from a recording medium 11-1 (first optical disk) having a first recording layer 12-1 which is formed at a place apart from a top surface 15 of the transparent substrate 13-1 by a first distance t, a recording medium 11-2 (second optical disk) having a second recording layer 12-2 which is formed at a place apart from the top surface 15 of the transparent substrate 13-2 by a second distance t' different from the first distance t and a recording medium 11-3 having both the first and second recording layers 12-1 and 12-2 therein, whereby either one of the first and second recording layers 12-1 and 12-2 is selectively used; and wherein the optical head means 14 being provided with a hologram element 2 at a place formed between the laser light source means 1 and the optical lens 3, and the system is characterized in that the hologram element 2 has a function in that the element 2 divides the light L emitted from the laser light source means 1, into 0th order transmitted light which forms a minute spot P from the light emitted from the laser light source means 1 onto the first recording layer 12-1, and 1st order diffracted light which forms a minute spot P' on the second recording layer 12-2, and further wherein a grating shape of the hologram element 2 is configured by an interference fringe 40 as shown in FIG. 6(B), formed between a spherical surface wave emitted from the laser light source means 1 and a spherical surface wave emitted from an imaginary point Q located on an optical axis AX and a light which would be emitted therefrom forms a minute spot P' on the second recording layer 12-2 when the optical lens 3 is used.

On the other hand, in the present invention, the optical information recording and/or playbacking apparatus of the present invention has a laser light source 1, an optical disk as an optical recording medium 11 which has a recording layer 12 on the rear surface of a transparent substrate 13, and an optical lens 3 which forms a minute spot P from the light L emitted from the above-noted laser light source means 1 onto the above-noted optical recording layer 12 of the disk 11, a hologram element 2 which divides the light L emitted from the above-noted laser light source 1 into 0th order transmitted light and 1st order diffracted light being provided between the above-noted laser light source 1 and the optical lens 3, a grating shape of the hologram element 2 is configured by an interference fringe 40 as shown in FIG. 6(B), formed between a spherical surface wave emitted from the laser light source means 1 and a spherical surface wave emitted from an imaginary point Q located on an optical axis AX and a light which would be emitted therefrom forms a minute spot P' on the second recording layer 12-2 when the optical lens 3 is used.

A feature of the above-noted hologram element 2 is that it is a sawtooth waveform grating. In addition, this hologram element 2 forms the above-noted interference fringe in a region that is smaller than the optical aperture of the lens.

Another feature of the present invention is the existence of a returning light dividing means 6 in a light-detecting system 7 which detects reflected light from the above-noted recording layer between the hologram element 2 and the optical lens 3. Yet another feature of the present invention is that the above-noted returning light dividing means 6 is a half-mirror or a polarizing beam splitter and a ¼-wavelength plate.

Further in the present invention, the interference fringe provided on the hologram element 2 has a configuration consisting of a plurality of concentric circles each center of which is located on the optical axis and wherein the interference fringe is represented by a set of solutions sufficient to the following formula;

$$(H^2+R_n^2)^{1/2}-\{(H-L)^2+R_n^2\}^{1/2}=n\lambda$$

wherein R denotes a radius of the interference fringe, $\lambda$ denotes a wave length of the light emitted from the laser light source means, H denotes a distance between the laser light source means and the hologram element, L denotes a distance between the laser light source means and the imaginary point and n denotes an integer number.

Note that the above-mentioned formula shows that a difference in light wave length formed between the wave length of the light emitted from the laser light source means and that of the light emitted from the imaginary point Q corresponds to a length as defined by $\lambda$ magnified by n (integer number).

In the present invention, the optical information recording medium includes, for example, an optical disk or the like having at least one recording layer on the rear surface of a transparent substrate.

In the present invention, as the above-mentioned optical information recording medium, at least two different kinds of optical information recording medium are used. One optical information recording medium 11-1 has a first recording layer 12-1 which is formed at a place apart from a top surface 15 of the transparent substrate 13-1 by a first distance t and a second one 11-2, has a second recording layer 12-2 which is formed at a place apart from the top surface 15 of the transparent substrate 13-2 by a second distance t' different from the first distance t.

Another optical information recording medium as can be used in the present invention is 11-3, including therein at least two different kinds of recording layers 12-1 and 12-2 as shown in FIG. 1(B), in that a first recording layer 12-1 which is formed at a place apart from a top surface 15 of the transparent substrate 13-1 by a first distance t and a second one 11-2, has a second recording layer 12-2 which is formed at a place apart from the top surface 15 of the same transparent substrate 13-3 by a second distance t' different from the first distance t.

As explained above, in the present invention, any one of the above-mentioned optical information recording mediums can be optionally selected and further any one of the first and the second recording layers can also be optionally selected for recording thereto or for playback therefrom.

The operation of the present invention will now be described with reference to FIG. 2.

Note that, although in the following explanation, a playbacking operation of the present invention is explained, as one of embodiments of the present invention, it is apparent that a recording operation of the present invention also can be performed in a similar manner as explained, hereunder.

Figure 2:
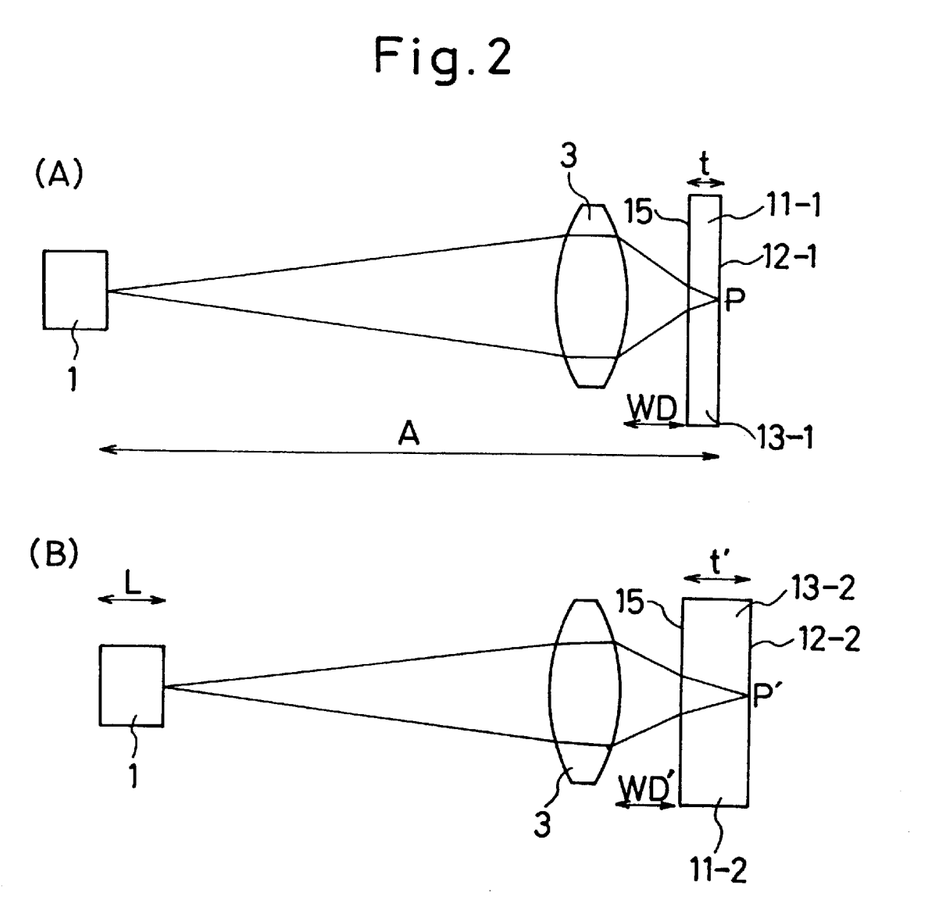
FIGS. 2(A) and 2(B) are simplified drawings which show the operation of an optical head means according to the present invention.

In FIG. 2, the reference numeral 1 denotes a laser light source, 3 is an aspherical lens, 11-1 is a first optical disk of thickness t, and 11-2 is a second optical disk of thickness t'.

FIG. 2 (A) shows the positioning of the focusing of the light emitted from the laser light source 1 onto the first recording layer 12-1 of the first optical disk 11-1 having a substrate thickness of t. The aspherical lens 3 is designed so that, in this arrangement, the aberration of the focused spot is minimized.

Using an aspherical lens designed in this above-noted manner, in the case in which a minute spot is collected onto a second disk 12-2 having a substrate thickness of t', by bringing the light source position closer by a distance of L to the aspherical lens 3, as shown in FIG. 2(B), it is possible to achieve a focused spot that has a level aberration that is not a problem in actual use.

The reason it is possible to achieve this feature is that the aberration occurring due to the parallel flat plate with respect to the light emitted from the laser light source means 1 and the aberration obtained in the light emitted from the imaginary light point Q, the location thereof is different from the laser light source means 1, are of the same form.

This characteristic does not require an aspherical optical lens such as noted above for forming the minute spot, and can be obtained as well by a combination of a plurality of lenses, or by a combination of a collimating lens which first collimates the light beam and an objective lens which focuses the resulting collimated light.

Figure 3:
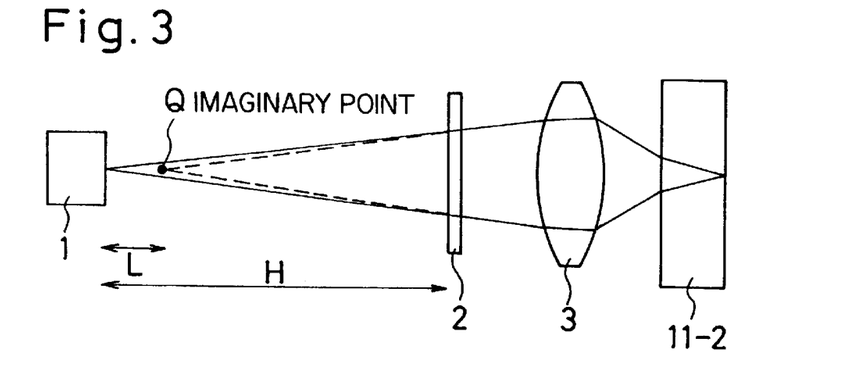
FIG. 3 is a simplified drawing which shows the operation of an optical head according to the present invention.

In the present invention, it is possible to accommodate the second disk 11-2 without moving the laser light source 1 of FIGS. 2(A) and 2(B) by positioning the hologram element 2 before the aspherical lens 3, as shown in FIG. 3.

Using this arrangement, the required form of the hologram grating is expressed as the interference between the spherical wavefront from the laser light source and the spherical wavefront from the imaginary point Q which is the position of a virtual laser light source removed by a distance of L on the optical axis.

The preferable configuration of the interference fringe of the hologram element 2 as used in the present invention had been explained above.

In the present invention, therefore, by finding the characteristic and appropriate distance of the optical lens, it is possible to achieve a hologram element with a grating shape that is simpler than in the prior art.

Additionally, because it is possible to calculate the grating shape as the interference between the two spherical wavefronts, from the laser light source and from the virtual point, it is easy to accommodate a change in distance between the hologram element 2 and the laser light source.

Although the above theory was described for the case of t<t', it is also applicable if the distance from the lens is increased by L in the case of t>t'.

In a practical use of the optical information recording or playbacking system of the present invention, since the positions of the laser light source means 1 and the recording medium in this system are basically fixed from the mechanical construction point of view, when either one of the first and second recording layers are selected, a position of the optical lens 3 in the optical head means 14 may be moved back and forth along a direction toward the recording layer 12-1 and 12-2.

EXAMPLE

The embodiments of the present invention will be described, with reference being made to the relevant accompanying drawings.

FIGS. 1(A) and 1(B) show the first embodiment of the present invention.

In FIG. 1(A), reference numeral 1 denotes a laser light source, 2 is a hologram element, 3 is an aspherical lens, 11-1 is a first optical disk, 11-2 is a second optical disk, 6 is a half-mirror, and 7 is a light-detecting system.

In this embodiment, a first optical information recording medium 11-1 and a second optical information recording medium 11-2, being separated from each other can be optionally selected and set into this system.

Light exiting from the laser light source 1 passes via the half-mirror 6, the hologram element 2, and the aspherical lens 3, and is focused onto a point P on, a surface of the recording layer 12-1 of the optical disk 11-1 passing through the substrate thereof. In doing this, the 0th order transmitted light of the hologram element 2, as shown by the solid line, is formed as a minute spot on the first optical disk 11-1, and the 1st order diffracted light thereof, as shown by the broken line, is formed as minute spot on the second optical disk 11-2.

Light which is reflected from the optical disk surface is separated by the half-mirror that is disposed between the laser light source 1 and the hologram element 2, thereby guiding it to the light-detecting system 7.

In the grating region of the hologram element 2 are formed an interference fringe between the spherical wavefront from the laser light source 1 and the spherical wavefront from the imaginary point Q which is the position of the virtual laser light source corresponding to the second optical disk, removed by a distance of L along the optical axis AX.

Next, the positioning in this first embodiment will be described with reference to FIG. 2 and FIG. 3. In the first embodiment as shown in FIG. 2, with respect to the first optical disk 11-1 with a substrate thickness of t=0.6 mm, the working distance from the lens to this first optical disk 11-1 is WD=1.5 mm.

With an objective lens having a focal length of 2.9 mm and an object-to-image distance A=27 mm, if t'=1.2 mm, the change in distance L is 6 mm. Under this condition, the operating distance becomes WD'=1.3 mm, so that there is almost no change in the working distances between the two optical disks.

This characteristic is advantageous in configuring an optical head apparatus which records to and plays back from optical disks having two different substrate thicknesses.

As shown in FIG. 3, if the distance from the laser light source 1 to the hologram element 2 is made 20 mm, the hologram grating is expressed as the interference between the spherical wavefronts from the distance of 20 mm and the distance of 14 mm.

If the radius of the hologram rating region is made 1 mm and a light source having a wavelength of 0.65 $\mu$m is used, this will be a concentric grating with a pitch of approximately 30 $\mu$m at outermost periphery.

This is a pitch that can be easily fabricated, and is an effective one at which the present invention is feasible.

By finding, in the present invention, the characteristic and appropriate distance of the optical lens, it is possible to achieve a hologram element with a grating shape that is simpler than in the prior art.

Additionally, because it is possible to calculate the grating shape as the interference between the two spherical wavefronts, from the laser light source and from the imaginary or virtual point Q, it is easy to accommodate a change in distance between the hologram element 2 and the laser light source.

In addition, because recording and playback of the optical disk 11-1 is done using 0th order transmitted light and recording and playback of the second optical disk 11-2 is done using 1st order diffracted light, the −1st order diffracted light becomes unnecessary, so that the grating of the hologram element 2 can be made a blazed grating, thereby suppressing the generation of −1st order diffraction and improving the efficiency of light utilization.

In accommodating an optical disk having a large substrate thickness, the smaller the lens aperture is, the greater will be the tolerance for relative inclination between the lens and the optical disk. This is because the smaller the angle of incidence is with respect to the area surrounding the focused beam, the smaller will be the influence of inclination.

Therefore, if the region in which the hologram is formed is limited so that it is small compared to the lens aperture, the beam diameter for the generated 1st order diffracted light is only the formation region of the hologram grating, so that it is possible to obtain the same effect as making the lens aperture small with respect to the second optical disk 11-2, without changing the lens aperture with respect to the first optical disk 11-1.

The above-mentioned embodiment can also be allied to another embodiment in that the optical information recording medium 11-3 as shown in FIG. 1(B) is used in this system and any one of the first and second recording layers 12-1 and 12-2 is optionally selected.

Figure 4:
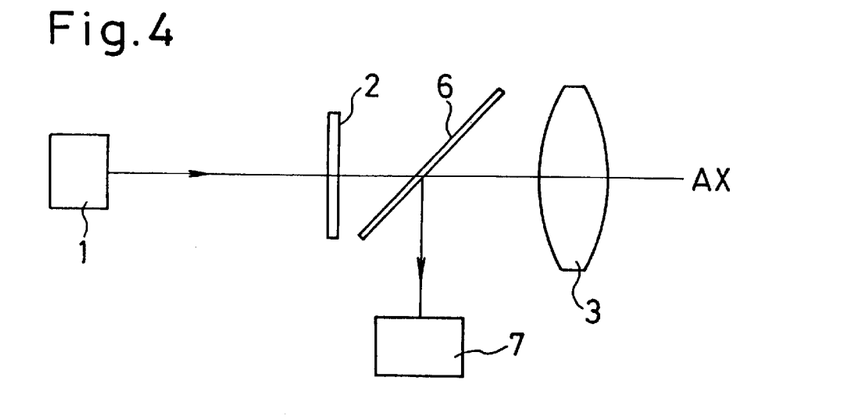
FIG. 4 is a simplified drawing which shows another embodiment of the present invention.

A second embodiment of the present invention is shown in FIG. 4. In the embodiment which is shown in FIG. 4, because the hologram element has the advantage of having its installation position easily changed, a half-mirror is placed between the aspherical lens 3 and the hologram element 2, thereby guiding reflected light from the optical disk to the light-detecting system 7 without passing though an intervening hologram element 2.

In this case, because the reflected light from the disk is not subjected to a diffraction loss at the hologram element, it is possible to obtain a highly efficient detected light output.

It is additionally possible to combine a half-mirror with a polarizing beam splitter or ¼-wavelength plate to achieve a further improvement in efficiency light utilization.

By virtue of the technical constitution of the present invention as described above in detail, because it is possible to use a hologram element formed from the simple interference between spherical wavefronts, it is easy to configure an optical head apparatus that accommodates optical disks having different substrate thicknesses.

What is claimed is:

1. An optical information recording or playbacking system comprising:
   means for providing a source of laser light,
   an optical information recording medium having at least one recording layer on a rear surface of a transparent substrate, and
   means for providing an optical head including:
      an optical lens forming a minute spot from a light emitted from said laser light source means onto said recording layer of said optical information recording medium,
      wherein said optical information recording medium includes:
         a recording medium having a first recording layer which is formed at a place apart from a top surface of said transparent substrate by a first distance, and
         a second recording layer which is formed at a place apart from said top surface of said transparent substrate by a second distance different from said first distance,
         whereby either one of said first and second recording layers is selectively used; and
      wherein said optical head means is provided with a hologram element at a place formed between said laser light source means and said optical lens, and further,
      said hologram element divides the light emitted from said laser light source means into:
         0th order transmitted light which forms a minute spot from the light emitted from said laser light source means onto said first recording layer, and
         1st order diffracted light which forms a minute spot on said second recording layer, and further,
      wherein a grating shape of said hologram element is configured by an interference fringe formed between a spherical surface wave emitted from said laser light source means, and a spherical surface wave emitted from an imaginary point located on an optical axis, and a light assumedly emitted therefrom, is formed as a minute spot on said second recording layer.

2. The optical information or playbacking system according to claim 1, wherein said interference fringe has a configuration consisting of a plurality of concentric circles, each center of which is located on said optical axis, and
   wherein said interference fringe is represented by a set of solutions sufficient to the following formula:

$$(H^2+R_n^2)^{1/2}\{(H-L)^2+R_n^2)\}^{1/2}=n\lambda$$

wherein R denotes a radius of said interference fringe, λ denotes a wave length of the light emitted from said laser light source means, H denotes a distance between said laser light source means and said hologram element, L denotes a distance between said laser light source means and said imaginary point, and n denotes an integer number.

3. The optical information recording or playbacking system according to claim 1, wherein said optical lens of said optical head means is arranged so that a position of said optical lens can move back and forth along a direction toward said recording layer.

4. The optical information recording or playbacking system according to claim 1, wherein said hologram element has a sawtooth waveform grating.

5. The optical information recording or playbacking system according to claim 1, wherein said hologram element has said interference fringe in a region that is smaller than an aperture of said optical lens.

6. The optical information recording or playbacking system according to claim 1, wherein means for dividing a returning light is provided between said hologram element and said optical lens, so as to guide reflected light from said recording layer to a light-detecting system.

7. The optical information recording or playbacking system according to claim 6, wherein said returning light dividing means is a combination from an element selected from a group consisting of a half-mirror and a polarizing beam splitter, and a ¼-wavelength plate.

8. An optical head used in an optical information recording or playbacking system which comprises a laser light source, and an optical information recording medium having at least one recording layer on a rear surface of a transparent substrate, said optical head comprising:
   an optical lens forming a minute spot from a light emitted from said laser light source onto said recording layer of said optical information recording medium, and
   wherein said optical information recording medium used for recording playbacking the optical information includes:
      a recording medium having a first recording layer which is formed at a place apart from a top surface of said transparent substrate by a first distance, and
      a second recording layer which is formed at a place apart from said top surface of said transparent substrate by a second distance different from said first distance,
      whereby either one of said first and second recording layers is selectively used; and
      said optical head is provided with an optical lens and a hologram element at a place formed between said laser light source and said optical lens, and
   said hologram element has a function in that said element divides the light emitted from said laser light source into:
      0th order transmitted light which forms a minute spot from the light emitted from said laser light source onto said first recording layer, and
      1st order diffracted light which forms a minute spot on said second recording layer, and further, wherein a grating shape of said hologram element is configured by an interference fringe formed between a spherical surface wave emitted from said laser light source, and a spherical surface wave emitted from an imaginary point located on an optical axis, and a light emitted therefrom, forms a minute spot on said second recording layer when said optical lens is used.

9. The optical head according to claim 8, wherein said interference fringe has a configuration consisting of a plurality of concentric circles, each center of which is located on said optical axis, and wherein said interference fringe is represented by a set of solutions sufficient to the following formula:

$$(H^2+R_n^2)^{1/2}\{(H-L)^2+R_n^2)\}^{1/2}=n\lambda$$

wherein R denotes a radius of said interference fringe, λ denotes a wave length of the light emitted from said laser light source, H denotes a distance between said laser light source and said hologram element, L denotes a distance between said laser light source and said imaginary point, and n denotes an integer number.

10. The optical head according to claim 8, wherein said optical lens of said optical head means is arranged so that a position of said optical lens can move back and forth along a direction toward said recording layer.

11. The optical head according to claim 8, wherein said hologram element has a sawtooth waveform grating.

12. A method for recording or playbacking an optical information system including means for providing a source of laser light, an optical information recording medium having at least one recording layer on a rear surface of a transparent substrate, and means for providing an optical head having an optical lens forming a minute spot from a light emitted from said laser light source means onto said recording layer of said optical information medium, said method for recording/playbacking optical information comprising the steps of:

selecting a recording medium to be used as an optical information recording medium, the recording medium having a first recording layer which is formed at a place apart from a top surface of said transparent substrate by a first distance, and a second recording layer which is formed at a place apart from said top surface of said transparent substrate by a second distance different from said first distance, whereby either one of said first and second recording layers is selectively used; and providing in said optical head means, a hologram element at a place formed between said laser light source means and said optical lens, and said hologram element having a function to divide the light emitted from said laser light source means, into:

0th order transmitted light which forms a minute spot from the light emitted from said laser light source means onto said first recording layer, and 1st order diffracted light which forms a minute spot on said second recording layer, and configuring a grating shape of said hologram element by an interference fringe formed between a spherical surface wave emitted from said laser light source means, and a spherical surface wave emitted from an imaginary point located on an optical axis, and wherein a light emitted therefrom, forms a minute spot on said second recording layer when said optical lens is used.

13. The method for recording or playbacking optical information according to claim 12, wherein said interference fringe has a configuration consisting of a plurality of concentric circles, each center of which is located on said optical axis, and wherein said interference fringe is represented by a set of solutions sufficient to the following formula:

$$(H^2+R_n^2)^{1/2}-\{(H-L)^2+R_n^2)\}^{1/2}=n\lambda$$

wherein R denotes a radius of said interference fringe, λ denotes a wave length of the light emitted from said laser light source means, H denotes a distance between said laser light source means and said hologram element, L denotes a distance between said laser light source means and said imaginary point, and n denotes an integer number.

14. The method for recording or playbacking optical information according to claim 12, wherein said optical lens of said optical head means is arranged so that a position of said optical lens can move back and forth along a direction toward said recording layer.

15. The method for recording or playbacking optical information according to claim 12, wherein said hologram element has a sawtooth waveform grating.

16. The method for recording or playbacking optical information according to claim 12, wherein said hologram element has an interference fringe in a region that is smaller than an aperture of said optical lens.

17. The method for recording or playbacking optical information according to claim 12, wherein means for dividing a returning light is provided between said hologram element and said optical lens, so as to guide reflected light from said recording layer to a light-detecting system.

18. The method for recording or playbacking optical information according to claim 17, wherein said returning light dividing means is combination from an element selected from a group consisting of a half-mirror and a polarizing beam splitter, and a ¼-wavelength plate.

* * * * *